(12) United States Patent
Kalman et al.

(10) Patent No.: US 11,570,113 B2
(45) Date of Patent: Jan. 31, 2023

(54) METHODS AND SYSTEMS FOR MANAGING QUALITY OF SERVICE IN A NETWORKED STORAGE ENVIRONMENT

(71) Applicant: NetApp Inc., Sunnyvale, CA (US)

(72) Inventors: Dean Alan Kalman, Cary, NC (US); John Alexander Scott, Cary, NC (US); Sudha Sundaram, Cary, NC (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 17/173,423

(22) Filed: Feb. 11, 2021

(65) Prior Publication Data

US 2021/0168080 A1 Jun. 3, 2021

Related U.S. Application Data (63) Continuation of application No. 16/389,155, filed on Apr. 19, 2019, now Pat. No. 10,944,679, which is a
(Continued)

(51) Int. Cl.
*H04L 47/24* (2022.01)
*H04L 43/0888* (2022.01)
(Continued)

(52) U.S. Cl.
CPC .............. *H04L 47/24* (2013.01); *G06F 3/061* (2013.01); *G06F 3/067* (2013.01); *G06F 3/0659* (2013.01);
(Continued)

(58) Field of Classification Search
CPC . H04L 47/24; H04L 41/0893; H04L 43/0888; H04L 67/1097; G06F 3/061; G06F 3/0659; G06F 3/067; G06F 3/0635
(Continued)

(56) References Cited

U.S. PATENT DOCUMENTS 8,856,400 B1 10/2014 Davidson et al.
9,112,873 B2 * 8/2015 Wakefield ........... H04L 65/1016
(Continued)

OTHER PUBLICATIONS

J. Jose, K. V. Mahathi, J. S. Shankar and M. Mutyam, "TRACKER: Alow overhead adaptive NoC router with load balancing selection strategy," 2012 IEEE/ACM International Conference on Computer-Aided Design (ICCAD), 2012, pp. 564-568. (Year: 2012).*
(Continued)

*Primary Examiner* — Jeffrey R Swearingen
(74) *Attorney, Agent, or Firm* — Cooper Legal Group, LLC (57) ABSTRACT

Methods and systems for a networked storage system are provided. One method includes assigning a quality of service (QOS) parameter for a storage volume of a networked storage environment having a first storage node and a second storage node, where the QOS parameter is defined by a throughput value that defines a maximum data transfer rate and a number of input/output (I/O) operations executed within a time period (IOPS); distributing the QOS parameter between the first storage node and the second storage node; determining that throughput credit is available for processing an I/O request for using the storage volume; determining that IOPS credit is available for processing the request by the first storage node; and processing the I/O request when both the throughput credit and the IOPS credit is available.

20 Claims, 8 Drawing Sheets

Related U.S. Application Data continuation of application No. 15/011,919, filed on Feb. 1, 2016, now Pat. No. 10,313,251.

(51) Int. Cl.
*H04L 67/1097* (2022.01)
*H04L 41/0893* (2022.01)
*G06F 3/06* (2006.01)

(52) U.S. Cl.
CPC ...... *H04L 41/0893* (2013.01); *H04L 43/0888* (2013.01); *H04L 67/1097* (2013.01); *G06F 3/0635* (2013.01)

(58) Field of Classification Search
USPC .......................................................... 709/224
See application file for complete search history.

(56) References Cited

U.S. PATENT DOCUMENTS

| | | | |
|---|---|---|---|
| 9,304,951 | B1 | 4/2016 | Chatterjee et al. |
| 9,436,391 | B1 | 9/2016 | Lewis et al. |
| 9,703,664 | B1 | 7/2017 | Alshawabkeh et al. |
| 10,146,465 | B1 | 12/2018 | Peterson |
| 2002/0174419 | A1 | 11/2002 | Alvarez et al. |
| 2005/0262183 | A1 | 11/2005 | Colrain et al. |
| 2006/0074970 | A1* | 4/2006 | Narayanan .......... G06F 11/3476 707/999.102 |
| 2006/0230086 | A1 | 10/2006 | Devarakonda et al. |
| 2010/0214925 | A1 | 8/2010 | Gormley |
| 2011/0119679 | A1 | 5/2011 | Muppirala et al. |
| 2011/0238546 | A1 | 9/2011 | Certain et al. |
| 2014/0351527 | A1* | 11/2014 | Traut ................... G06F 3/0659 711/154 |
| 2015/0199253 | A1 | 7/2015 | Sprague et al. |
| 2015/0201017 | A1 | 7/2015 | Hrischuk et al. |
| 2016/0004552 | A1 | 1/2016 | Innan et al. |
| 2016/0149828 | A1 | 5/2016 | Vijayan et al. |
| 2017/0078921 | A1 | 3/2017 | Xia et al. |
| 2017/0168729 | A1 | 6/2017 | Faulkner et al. |
| 2017/0206021 | A1 | 7/2017 | Nakajima |

OTHER PUBLICATIONS

B. Yang, G. Song, Y. Zheng and Y. Wu, "QoSC: A QoS-Aware Storage Cloud Based on HDFS," 2015 International Symposium on Security and Privacy in Social Networks and Big Data (SocialSec), 2015, pp. 32-38 (Year: 2015).*

"Brief Announcement: Application-Sensitive QoS Scheduling in Storage Servers", Jun. 2012, Ahmed Elnably and Peter Verman, Proceedings of the twenty-fourth annual ACM symposium on Parallelism in algorithms and architectures, pp. 185-187.

"Efficient QOS for Multi-Tiered Storage Systems", Jun. 2012, Ahmed Elnably, Hui Wang, Ajay Gulati and Peter Varman, HotStorage, 4th USENIX Workshop on Hot Topics in Storage and File Systems, pp. 1-5.

"QoS-Aware Storage Virtualization for Cloud File Systems", 2014, Christoph Kleineweber, Alexander Reinefeld and Thorsten Schutt, Proceedings of the 1st ACM International Workshop on Programmable File Systems, pp. 19-26.

"Controlling Network Bandwidth to Support Storage QoS", 2007, Junkil Ryu and Chanik Park, Ieee Computer Society, Fourth International Workshop on Storage Network Architecture and Parallel I/Os (SNAPI 2007), San Diego, CA, pp. 60-68.

"Design and Implementation of Scalable QoS Policy Management System", 2015, Wentao Xie, Xiaomei Chen and Dandan Li, IEEE 12th International Conference on Ubiquitous Intelligence and Computing, (UIC-ATC-ScaiCom), Beijing, pp. 1682-1685.

* cited by examiner

METHODS AND SYSTEMS FOR MANAGING QUALITY OF SERVICE IN A NETWORKED STORAGE ENVIRONMENT

Related Applications: This application claims priority to and is a continuation of U.S. patent application Ser. No. 16/389,155, titled "METHODS AND SYSTEMS FOR MANAGING QUALITY OF SERVICE IN A NETWORKED STORAGE ENVIRONMENT" and filed on Apr. 19, 2019, which claims priority to and is a continuation of U.S. patent application Ser. No. 15/011,919, titled "METHODS AND SYSTEMS FOR MANAGING QUALITY OF SERVICE IN A NETWORKED STORAGE ENVIRONMENT" and filed on Feb. 1, 2016, which are incorporated herein by reference.

Technical Field: The present disclosure relates to managing quality of service (QOS) in a networked storage environment.

Background: Various forms of storage systems are used today. These forms include direct attached storage (DAS) network attached storage (NAS) systems, storage area networks (SANs), and others. Network storage systems are commonly used for a variety of purposes, such as providing multiple clients with access to shared data, backing up data and others.

A storage system typically includes at least a computing system executing a storage operating system for storing and retrieving data on behalf of one or more client computing systems (may just be referred to as "client" or "clients"). The storage operating system stores and manages shared data containers in a set of mass storage devices.

QOS is a metric used in a storage environment to provide certain throughput for processing input/output (I/O) requests for reading or writing data and a number of I/O requests processed within a given time (for example, in a second (IOPS). Throughput means amount of data transferred within a given time, for example, in megabytes per second (MBps). Continuous efforts are being made to better manage resources of networked storage environments.

BRIEF DESCRIPTION OF THE DRAWINGS

The various features of the present disclosure will now be described with reference to the drawings of the various aspects. In the drawings, the same components may have the same reference numerals. The illustrated aspects are intended to illustrate, but not to limit the present disclosure. The drawings include the following Figures.

DETAILED DESCRIPTION

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a hardware processor, a hardware based processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

In one aspect, methods and systems for managing quality of service (QOS) are provided. QOS provides a certain throughput (i.e. amount of data that is transferred within a given time interval (for example, megabytes per seconds (MBps) and/or a number of input/output operations that can be processed within a time interval, for example, in a second (referred to as IOPS). As an example, method includes assigning a QOS parameter for a storage volume of a networked storage environment having a first storage node and a second storage node, where the QOS parameter is defined by a throughput value that defines a maximum data transfer rate and a number of input/output (I/O) operations executed within a time period (IOPS); distributing the QOS parameter between the first storage node and the second storage node; determining that throughput credit is available for processing an I/O request for using the storage volume; determining that IOPS credit is available for processing the request by the first storage node; and processing the I/O request when both the throughput credit and the IOPS credit is available.

Figure 1:
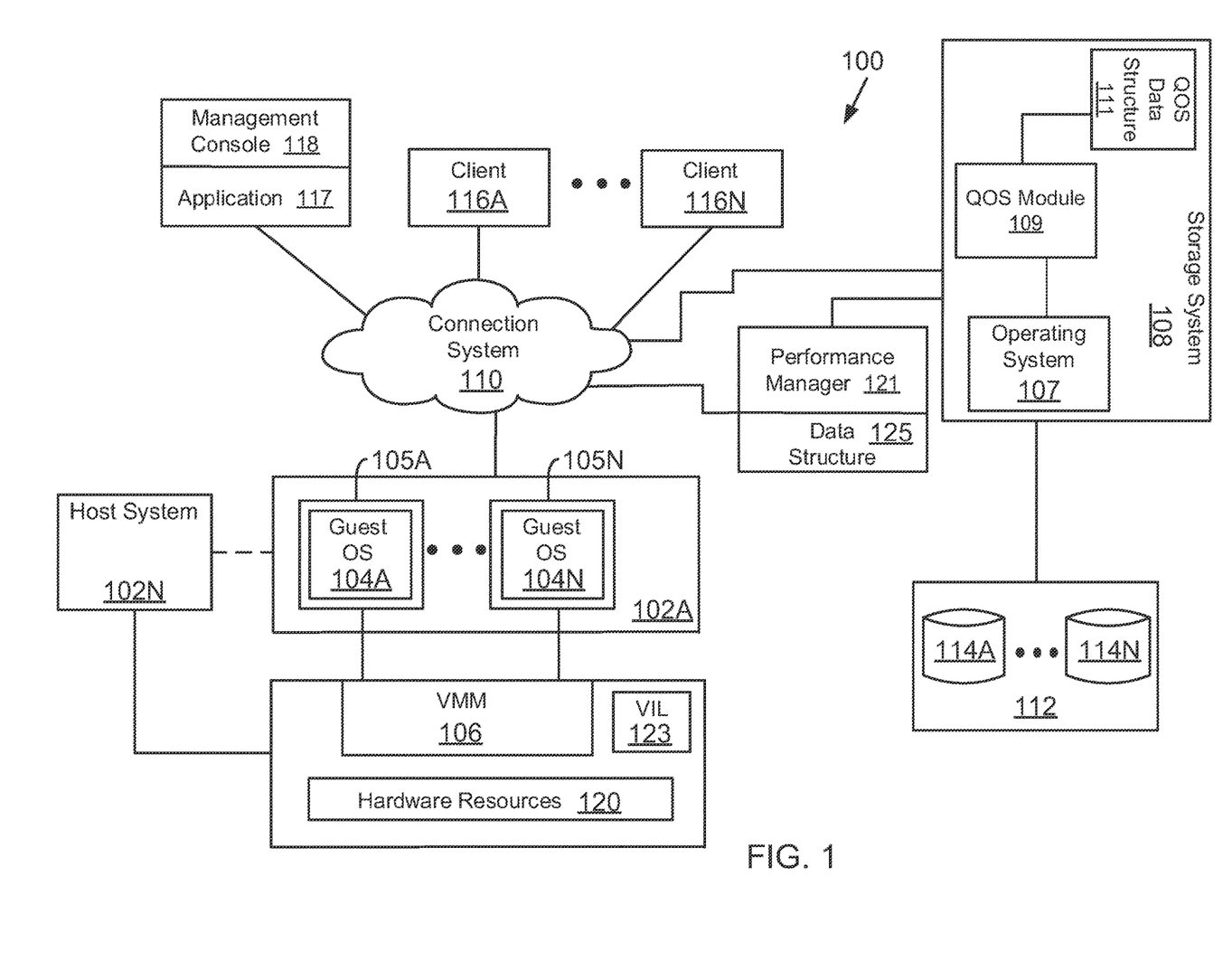
FIG. 1 shows an example of an operating environment for the various aspects disclosed herein.

System 100: FIG. 1 shows an example of a system 100, where the various adaptive aspects disclosed herein may be implemented. System 100 includes a storage system 108 that executes a storage operating system 107. The storage system 108 has access to a set of mass storage devices 114A-114N (may be referred to as storage devices 114 or simply as storage device 114) within at least one storage subsystem 112. The storage devices 114 may include writable storage device media such as magnetic disks, video tape, optical, DVD, magnetic tape, non-volatile memory devices for example, solid state drives (SSDs) including self-encrypting drives, flash memory devices and any other similar media adapted to store information. The storage devices 114 may be organized as one or more groups of Redundant Array of Independent (or Inexpensive) Disks (RAID). The aspects disclosed are not limited to any particular storage device type or storage device configuration.

In one aspect, the storage system 108 provides a set of logical storage volumes (may be interchangeably referred to as volume or storage volume) for providing physical storage space to clients 116A-116N (or virtual machines (VMs) 105A-105N). A storage volume is a logical storage object and typically includes a file system in a NAS environment or a logical unit number (LUN) in a SAN environment. The various aspects described herein are not limited to any specific format in which physical storage is presented as logical storage (volume, LUNs and others)

Each storage volume may be configured to store data files (or data containers or data objects), scripts, word processing documents, executable programs, and any other type of structured or unstructured data. From the perspective of one of the client systems, each storage volume can appear to be a single drive. However, each storage volume can represent storage space in at one storage device, an aggregate of some or all of the storage space in multiple storage devices, a RAID group, or any other suitable set of storage space.

A storage volume is identified by a unique identifier (Volume-ID) and is allocated certain storage space during a configuration process. When the storage volume is created, a QOS policy may be associated with the storage volume such that requests associated with the storage volume can be managed appropriately. The QOS policy may be a part of a QOS policy group (referred to as "Policy_Group") that is used to manage QOS for several different storage volumes as a single unit. The QOS policy information may be stored at a QOS data structure 111 maintained by a QOS module 109. QOS at the storage system level may be implemented by the QOS module 109.

The storage operating system 107 organizes physical storage space at storage devices 114 as one or more "aggregate", where each aggregate is a logical grouping of physical storage identified by a unique identifier and a location. The aggregate includes a certain amount of storage space that can be expanded. Within each aggregate, one or more storage volumes are created whose size can be varied. A qtree, sub-volume unit may also be created within the storage volumes.

The storage system 108 may be used to store and manage information at storage devices 114 based on an I/O request. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols, for example, the Small Computer Systems Interface (SCSI) protocol encapsulated over TCP (iSCSI) and SCSI encapsulated over Fibre Channel (FCP).

In a typical mode of operation, a client (or a VM) transmits one or more I/O request, such as a CFS or NFS read or write request, over a connection system 110 to the storage system 108. Storage operating system 107 receives the request, issues one or more I/O commands to storage devices 114 to read or write the data on behalf of the client system, and issues a CIFS or NFS response containing the requested data over the network 110 to the respective client system.

System 100 may also include a virtual machine environment where a physical resource is time-shared among a plurality of independently operating processor executable VMs. Each VM may function as a self-contained platform, running its own operating system (OS) and computer executable, application software. The computer executable instructions running in a VM may be collectively referred to herein as "guest software." In addition, resources available within the VM may be referred to herein as "guest resources."

The guest software expects to operate as if it were running on a dedicated computer rather than in a VM. That is, the guest software expects to control various events and have access to hardware resources on a physical computing system (may also be referred to as a host platform or host system) which may be referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host system.

In one aspect, system 100 may include a plurality of computing systems 102A-102N (may also be referred to individually as host platform/system 102 or simply as server 102) communicably coupled to the storage system 108 via the connection system 110 such as a local area network (LAN), wide area network (WAN), the Internet or any other interconnect type. As described herein, the term "communicably coupled" may refer to a direct connection, a network connection, a wireless connection or other connections to enable communication between devices.

Host system 102A includes a processor executable virtual machine environment having a plurality of VMs 105A-105N that may be presented to client computing devices/systems 116A-116N. VMs 105A-105N execute a plurality of guest OS 104A-104N (may also be referred to as guest OS 104) that share hardware resources 120. As described above, hardware resources 120 may include processors, memory, I/O devices, storage or any other hardware resource.

In one aspect, host system 102 interfaces with a virtual machine monitor (VMM) 106, for example, a processor executed Hyper-V layer provided by Microsoft Corporation of Redmond, Wash., a hypervisor layer provided by VMWare Inc., or any other type. VMM 106 presents and manages the plurality of guest OS 104A-104N executed by the host system 102. The VMM 106 may include or interface with a virtualization layer (VIL) 123 that provides one or more virtualized hardware resource to each OS 104A-104N.

In one aspect, VMM 106 is executed by host system 102A with VMs 105A-105N. In another aspect, VMM 106 may be executed by an independent stand-alone computing system, often referred to as a hypervisor server or VMM server and VMs 105A-105N are presented at one or more computing systems.

It is noteworthy that different vendors provide different virtualization environments, for example, VMware Corporation, Microsoft Corporation and others. The generic virtualization environment described above with respect to FIG. 1 may be customized to implement the aspects of the present disclosure. Furthermore, VMM 106 (or VIL 123) may execute other modules, for example, a storage driver, network interface and others, the details of which are not germane to the aspects described herein and hence have not been described in detail.

System 100 may also include a management console 118 that executes a processor executable management application 117 for managing and configuring various elements of system 100. Application 117 may be used to manage and configure VMs and clients as well as configure resources that are used by VMs/clients, according to one aspect. It is noteworthy that although a single management console 118 is shown in FIG. 1, system 100 may include other management consoles performing certain functions, for example, managing storage systems, managing network connections and other functions described below.

In one aspect, application 117 may be used to present storage space that is managed by storage system 108 to clients' 116A-116N (or VMs). The clients may be grouped into different service levels (also referred to as service level objectives or "SLOs"), where a client with a higher service level may be provided with more storage space than a client with a lower service level. A client at a higher level may also be provided with a certain QOS vis-à-vis a client at a lower level.

Optionally, system 100 may also include a performance manager 121 that interfaces with a storage operating system 107 of a storage system 108 for receiving QOS data. The performance manager 121 may be a processor executable module that is executed by one or more processors out of a memory device. The performance manager 121 obtains the QOS data and stores it at a data structure 125.

Figure 2:
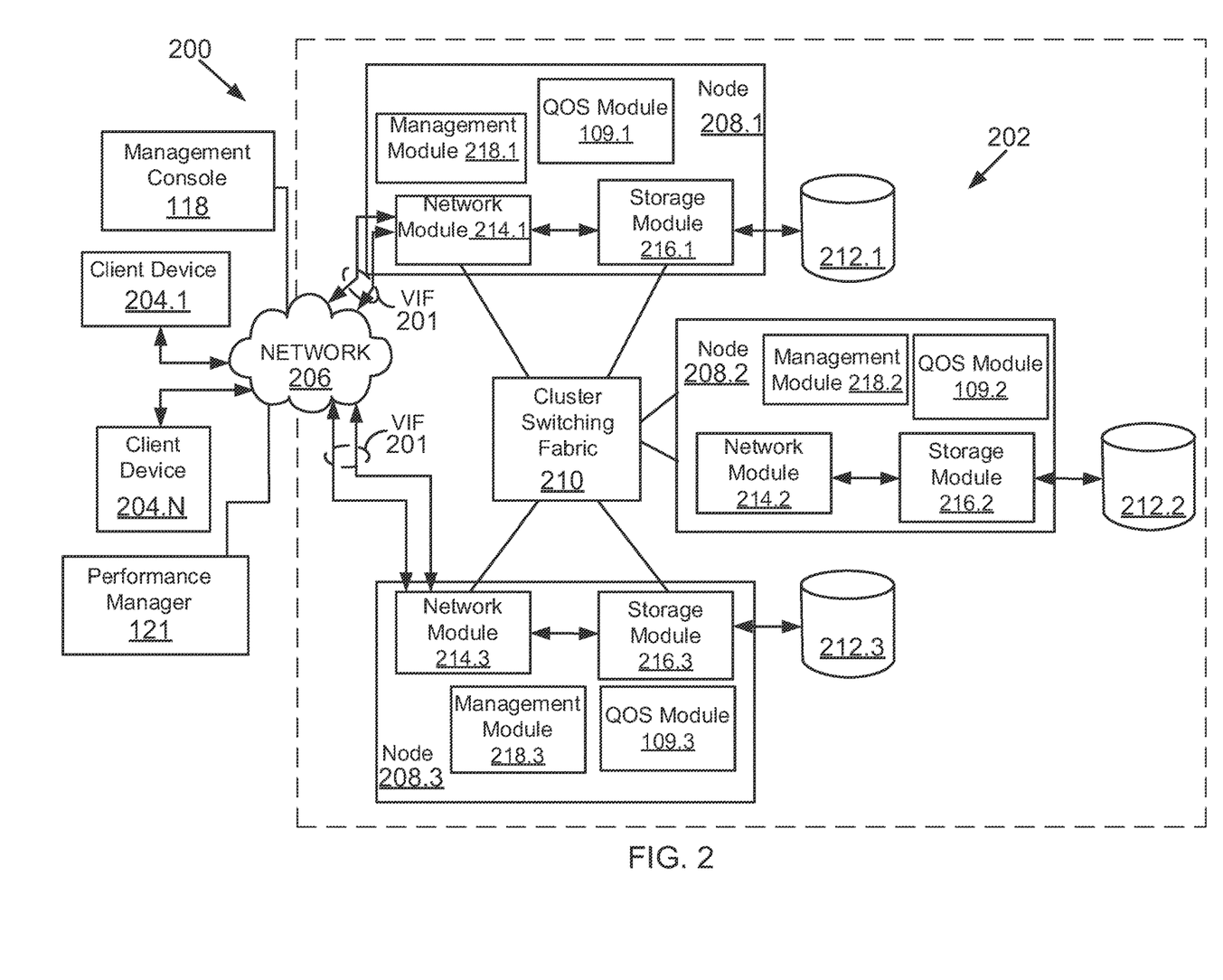
FIG. 2 shows an example of a clustered storage system in a networked storage environment, used according to one aspect of the present disclosure.

Although storage system 108 is shown as a stand-alone system, i.e. a non-cluster based system, in another aspect, storage system 108 may have a distributed architecture; for example, a cluster based system of FIG. 2. Before describing the various process flows of the present disclosure, the following provides a description of a cluster based storage system.

Clustered Storage System: FIG. 2 shows a cluster based storage environment 200 having a plurality of nodes for managing storage devices, according to one aspect. Storage environment 200 may include a plurality of client systems 204.1-204.N (similar to clients 116A-116N, FIG. 1), a clustered storage system 202, the performance manager 121, the management console 118 and at least a network 206 communicably connecting the client systems 204.1-204.N and the clustered storage system 202.

The clustered storage system 202 includes a plurality of nodes 208.1-208.3, a cluster switching fabric 210, and a plurality of mass storage devices 212.1-212.3 (may be referred to as 212 and similar to storage device 114) that are used as resources for processing I/O requests.

Each of the plurality of nodes 208.1-208.3 is configured to include a network module (maybe referred to as N-module), a storage module (maybe referred to as D-module), and a management module (maybe referred to as M-Module), each of which can be implemented as a processor executable module. Specifically, node 208.1 includes a network module 214.1, a storage module 216.1, and a management module 218.1, node 208.2 includes a network module 214.2, a storage module 216.2, and a management module 218.2, and node 208.3 includes a network module 214.3, a storage module 216.3, and a management module 218.3.

The network modules 214.1-214.3 include functionality that enable the respective nodes 208.1-208.3 to connect to one or more of the client systems 204.1-204.N over the computer network 206, while the storage modules 216.1-216.3 connect to one or more of the storage devices 212.1-212.3. Accordingly, each of the plurality of nodes 208.1-208.3 in the clustered storage server arrangement provides the functionality of a storage server.

The management modules 218.1-218.3 provide management functions for the clustered storage system 202. The management modules 218.1-218.3 collect storage information regarding storage devices 212.

Each node may execute or interface with a QOS module, shown as 109.1-109.3 that is similar to the QOS module 109. The QOS module 109 may be executed for each node or a single QOS module may be used for the entire cluster. The aspects disclosed herein are not limited to the number of instances of QOS module 109 that may be used in a cluster.

A switched virtualization layer including a plurality of virtual interfaces (VIFs) 201 is provided to interface between the respective network modules 214.1-214.3 and the client systems 204.1-204.N, allowing storage 212.1-212.3 associated with the nodes 208.1-208.3 to be presented to the client systems 204.1-204.N as a single shared storage pool.

The clustered storage system 202 can be organized into any suitable number of virtual servers (also referred to as "vservers" or storage virtual machines (SVM)), in which each SVM represents a single storage system namespace with separate network access. Each SVM has a client domain and a security domain that are separate from the client and security domains of other SVMs. Moreover, each SVM is associated with one or more VIFs and can span one or more physical nodes, each of which can hold one or more VIFs and storage associated with one or more SVMs. Client systems can access the data on a SVM from any node of the clustered system, through the VIFs associated with that SVM. It is noteworthy that the aspects described herein are not limited to the use of SVMs.

Each of the nodes 208.1-208.3 is defined as a computing system to provide application services to one or more of the client systems 204.1-204.N. The nodes 208.1-208.3 are interconnected by the switching fabric 210, which, for example, may be embodied as a Gigabit Ethernet switch or any other type of switching/connecting device.

Although FIG. 2 depicts an equal number (i.e., 3) of the network modules 214.1-214.3, the storage modules 216.1-216.3, and the management modules 218.1-218.3, any other suitable number of network modules, storage modules, and management modules may be provided. There may also be different numbers of network modules, storage modules, and/or management modules within the clustered storage system 202. For example, in alternative aspects, the clustered storage system 202 may include a plurality of network modules and a plurality of storage modules interconnected in a configuration that does not reflect a one-to-one correspondence between the network modules and storage modules.

Each client system 204.1-204.N may request the services of one of the respective nodes 208.1, 208.2, 208.3, and that node may return the results of the services requested by the client system by exchanging packets over the computer network 206, which may be wire-based, optical fiber, wireless, or any other suitable combination thereof.

Figure 3:
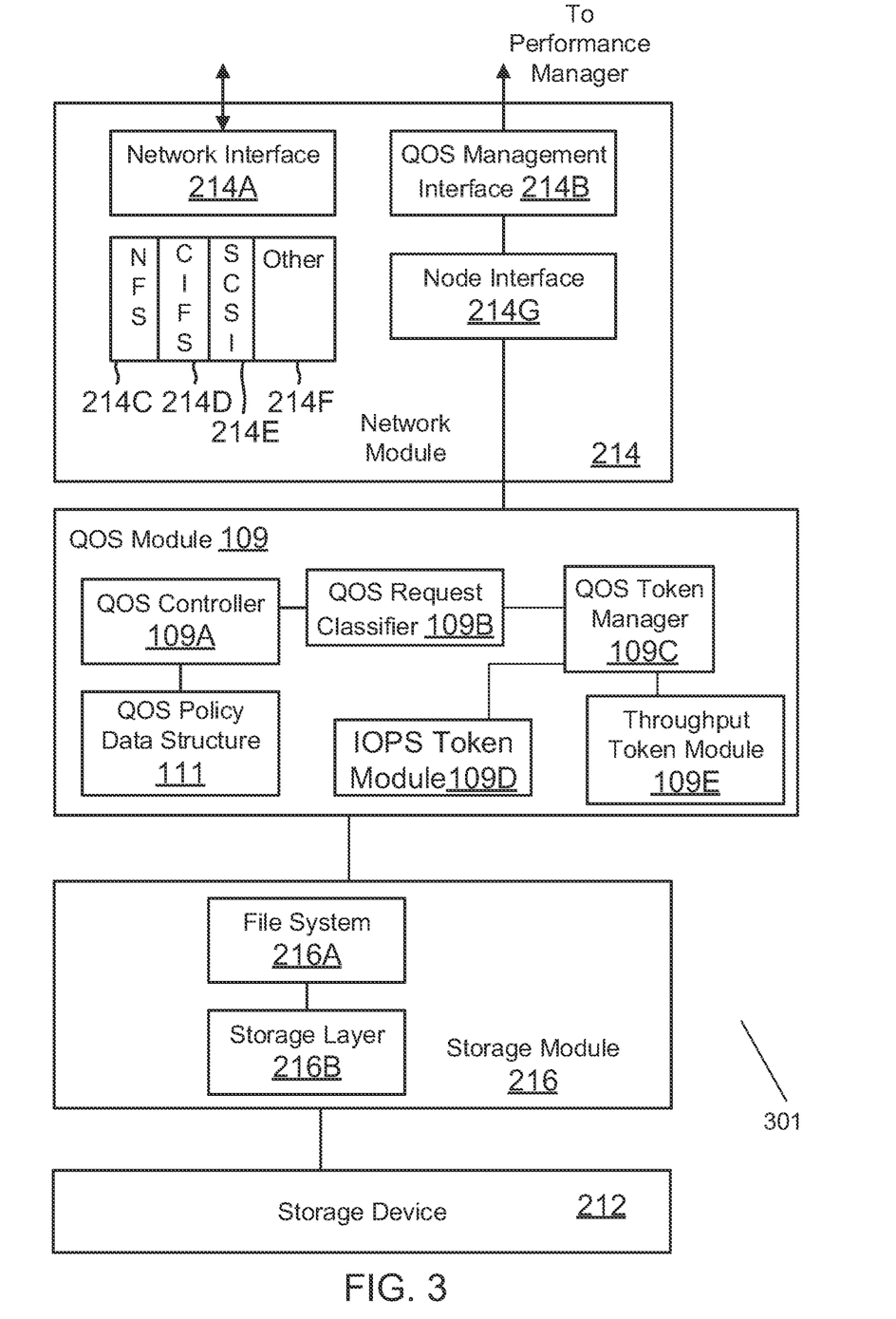
FIG. 3 shows an example of handling QOS requests by a storage system, according to one aspect of the present disclosure.

QOS Overview: FIG. 3 shows a system 301 for managing QOS by the storage system 202. As an example, the network module 214 of a cluster includes a network interface 214A for receiving requests from clients to read and/or write data at a storage volume. Network module 214 executes a NFS module 214C for handling NFS requests, a CIFS module 214D for handling CIFS requests, a SCSI module 214E for handling iSCSI requests and an others module 214F for handling "other" requests.

The network module 214 includes a node interface 214G that is used to communicate with the QOS module 109, storage module 216 and/or another network module 214. The network module 214 may also include a QOS management interface 214B that is used to provide QOS data from the cluster to the performance manager 121 or any other entity.

QOS module 109 includes a QOS controller 109A, a QOS request classifier 109B, QOS policy data structure (or Policy_Group) 111 and a QOS token manager 109C, according to one aspect of the present disclosure. The QOS policy data structure 111 stores policy level details for implementing QOS for clients and storage volumes. The policy specifies a throughput rate and a number of IOPS that are permitted for a client and/or for specific storage volumes, files, LUN or other physical or logical objects. The policy determines how I/O requests are processed for different volumes, logical objects and/or clients.

The storage module 216 executes a file system 216A (a part of storage operating system 107 described below) and includes a storage layer 216B to interface with storage device 212.

In one aspect, an I/O request arrives at network module 214 from a client or from an internal process. Internal process in this context may include a de-duplication module, a replication engine module or any other entity that needs to perform a read and/or write operation at the storage device 212. The request is sent to the QOS request classifier 109B to associate the request with a particular workload (or volume). The QOS classifier 109B evaluates a request's attributes and looks for matches within the QOS policy data structure 111. The request is assigned to a particular workload, when there is a match. If there is no match, then a default workload may be assigned.

A workload may include a plurality of streams, where each stream may have a plurality of requests. The requests may be generated by any entity, for example, an external entity, like a client system and/or an internal entity, for example, a replication engine that replicates storage volumes at one or more storage location. A request may have a plurality of attributes, for example, a source, a path, a destination and I/O properties. The source identifies the source from where a request originates, for example, an internal process, a host or client address, a user application and others. The path defines the entry path into the storage system. For example, a path may be a logical interface (LIF) or a protocol, such as NFS, CIFS, iSCSI and Fibre Channel protocol. A destination is the target of a request, for example, storage volumes, LUNs, data containers and others. I/O properties include operation type (i.e. read/write/other), request size and any other property.

In one aspect, streams may be grouped together based on client needs. For example, if a group of clients make up a department on two different subnets, then two different streams with the "source" restrictions can be defined and grouped within the same workload.

Once the request is classified for a workload, QOS controller 109A determines if a rate limit (i.e. a throughput rate) and the number of IOPS for the request/storage volume has been reached. If yes, then the request is queued for later processing until credit is available for executing the request. If not, then the request is sent to file system 216A for further processing with a completion deadline. File system 216A determines how queued requests should be processed based on completion deadlines.

In one aspect, the QOS token manager 109C interfaces with an IOPS token module 109D and a throughput token module 109E. It is noteworthy that although separate token modules are shown as an example, the two modules may be part of a single module.

The IOPS token module 109D provides a token that indicates a workload has not reached its IOPS limit and that credit is available for processing the request. The throughput token module 109E provides a token that indicates that the workload has not reached its throughput requirement and credit is available for processing the request.

In one aspect, the token manager 109C maintains a token count for a volume. When data is transferred and IOPS are processed, then credit is used i.e. tokens are reduced for both throughput and IOPS. The number of tokens for both IOPS and throughput are based on the assigned QOS for the volume and stored at the policy data structure 111.

The foregoing system is different from conventional systems where either IOPS or throughput is used for managing QOS. The conventional approach has shortcomings because a client may issue a single I/O with large data transfer size to circumvent an IOPS restriction or send numerous I/O requests to circumvent throughput restrictions. Using both token managers mitigates this shortcoming.

Figure 4:
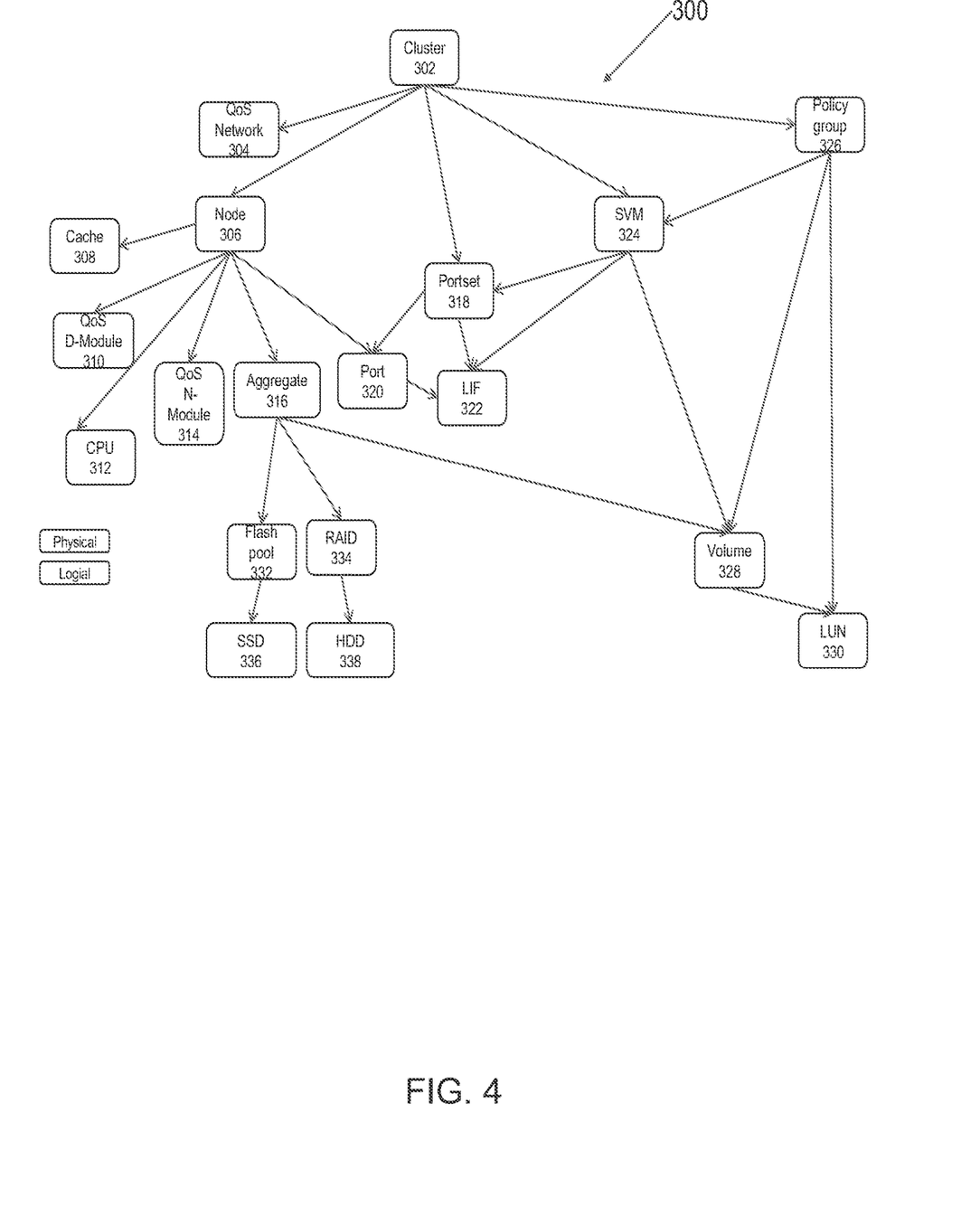
FIG. 4 shows a format for managing various resource objects, according to one aspect of the present disclosure.

Object Hierarchy: FIG. 4 shows an example of a format 300 for tracking information regarding different resources that are used within a clustered storage system (for example, 202, FIG. 2). Each resource is identified by a unique resource identifier value. The resource identifier value may be used to obtain available performance capacity of a resource.

Format 300 maybe hierarchical in nature where various objects may have parent-child, peer and remote peer relationships, as described below. As an example, format 300 shows a cluster object 302 that may be categorized as a root object type for tracking cluster level resources. The cluster object 302 is associated with various child objects, for example, a node object 306, QOS network object 304, a portset object 318, a SVM object 324 and a policy group 326. The cluster object 302 stores information regarding the cluster, for example, the number of nodes it may have, information identifying the nodes; and any other information.

The QOS network object 304 is used to monitor network resources, for example, network switches and associated bandwidth used by a clustered storage system.

The cluster node object 306 stores information regarding a node, for example, a node identifier and other information. Each cluster node object 306 is associated with a pluralities of child objects, for example, a cache object 308, a QOS object for a storage module 310, a QOS object for a network module 314, a CPU object 312 and an aggregate object 316. The cache object 308 is used to track utilization/latency of a cache. The QOS storage module 310 tracks the QOS of a storage module defined by a QOS policy data structure 111 described above in detail with respect to FIG. 3. The QOS network module object 314 tracks the QOS for a network module. The CPU object 312 is used to track CPU performance and utilization of a node.

The aggregate object 316 tracks the utilization/latency of a storage aggregate that is managed by a cluster node. The aggregate object may have various child objects, for example, a flash pool object 332 that tracks usage of a plurality of flash based storage devices (shown as "flash pool"). The flash pool object 332 may have a SSD disk object 336 that tracks the actual usage of specific SSD based storage devices. The RAID group 334 is used to track the usage of storage devices configured as RAID devices. The RAID object 334 includes a storage device object 338 (shown as a HDD (hard disk drive) that tracks the actual utilization of the storage devices.

Each cluster is provided a portset having a plurality of ports that may be used to access cluster resources. A port includes logic and circuitry for processing information that is used for communication between different resources of the storage system. The portset object 318 tracks the various members of the portset using a port object 320 and a LIF object 322. The LIF object 322 includes a logical interface, for example, an IP address, while the port object 320 includes a port identifier for a port, for example, a worldwide port number (WWPN). It is noteworthy that the port object 320 is also a child object of node 306 that may use a port for network communication with clients.

A cluster may present one or more SVMs to client systems. The SVMs are tracked by the SVM object 324, which is a child object of cluster 302. Each cluster is also associated with a policy group that is tracked by a policy group object 326. The policy group 326 is associated with SVM object 324 as well as storage volumes and LUNs. The storage volume is tracked by a volume object 328 and the LUN is tracked by a LUN object 330. The volume object 328 includes an identifier identifying a volume, size of the volume, clients associated with the volume, volume type (i.e. flexible or fixed size) and other information. The LUN object 330 includes information that identifies the LUN (LUNID), size of the LUN, LUN type (read, write or read and write) and other information.

Figure 5:
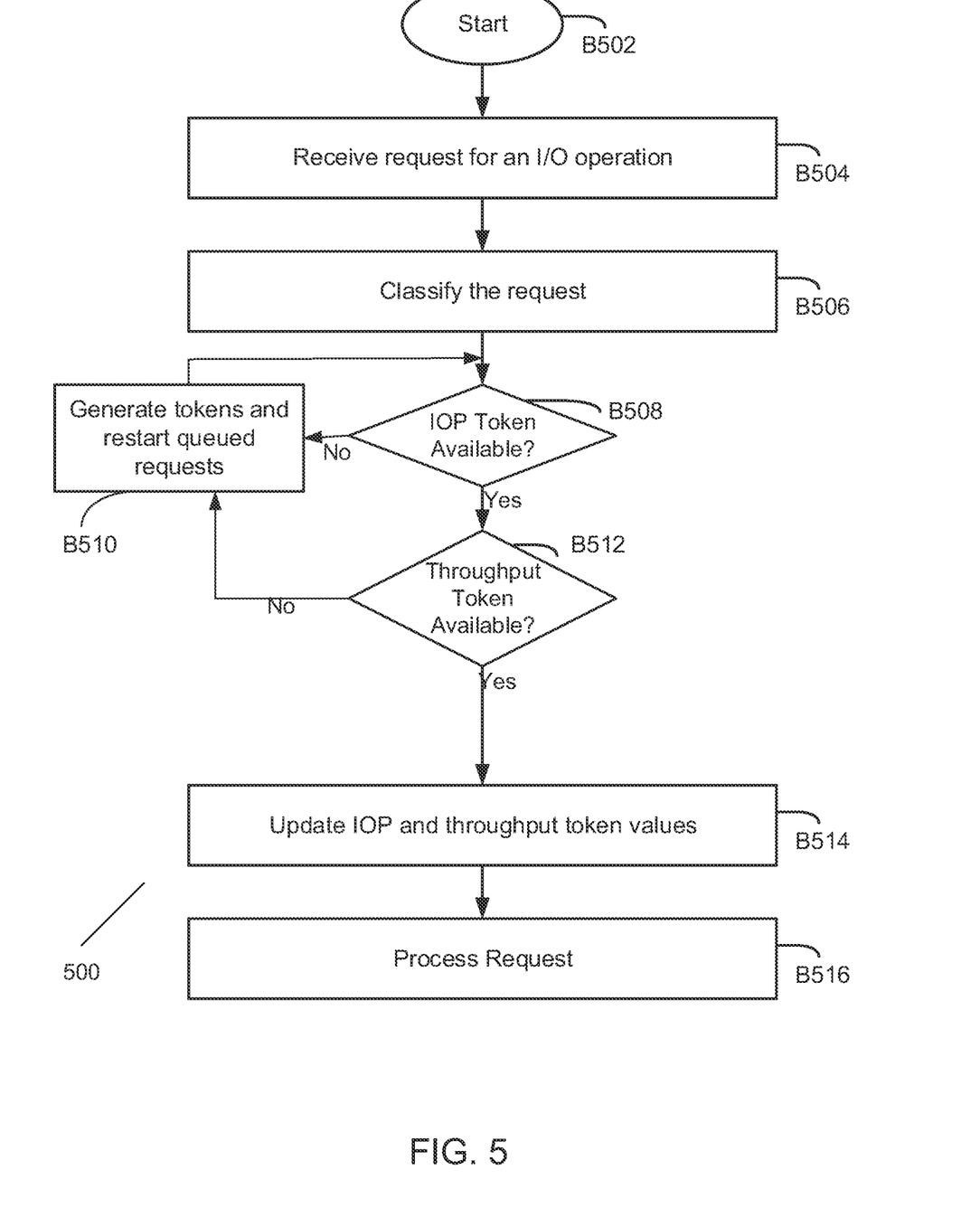
FIGS. 5-6 shows process flow diagrams for handling QOS requirements; according to one aspect of the present disclosure.

Process Flows: FIG. 5 shows a process 500 for managing QOS, according to one aspect of the present disclosure. The process begins in block B502, when a volume has been configured or is being configured. The volume is presented to a client for storing data. The storage devices that store the data on behalf of the client may be managed by one or more nodes. In one aspect, the storage volume is assigned a certain throughput rate and a number of IOPS. The throughput rate and the number of IOPS may be part of a range.

In block B506, an I/O request is received by a storage system node. In one aspect, the I/O request may be received by a network module 214 of a node and then forwarded to QOS module 109, where the QOS classifier 109B classifies the request. The classification is based on the attributes of the request. For example, the attributes may include a request type (read, write, create, open and others); request target (i.e. the storage object that is being managed, for example, a volume, file or a LUN within a volume); request source (i.e. a client system); request protocol (for example, NFS, CIFS, iSCSI, FCP and others). The request is then assigned to a workload (for example, a volume). Based on the attributes, the workload is assigned a throughput and a number of IOPS.

In block B508, the token manager 109C queries the IOPS token module 109D to determine if an IOPS token is available for the request. This is based on whether the number of IOPS available for the workload have reached a threshold value. The threshold value determines the number of IOPS that are assigned for the workload. If a token is not available, the process moves to block B510.

If an IOPS token is available, then in block B512, the token manager 109C queries the throughput token module 109E to determine if a throughput token is available. This is based on whether the throughput for the workload has reached a threshold value. The threshold value is again based on the assigned throughput for the workload.

If the throughput token is not available, then the process simply waits in block B510 when new tokens are generated and the queued requests are processed. In one aspect, a timer (not shown) is used to trigger token generation and processing of requests by sending reverting to block B508.

When a throughput token is available in block B512, then the IOPS and throughput token values are updated by modules 109D and 109E. The request is processed in block B516 to either read data or store data at a storage device, based on the request.

Figure 6:
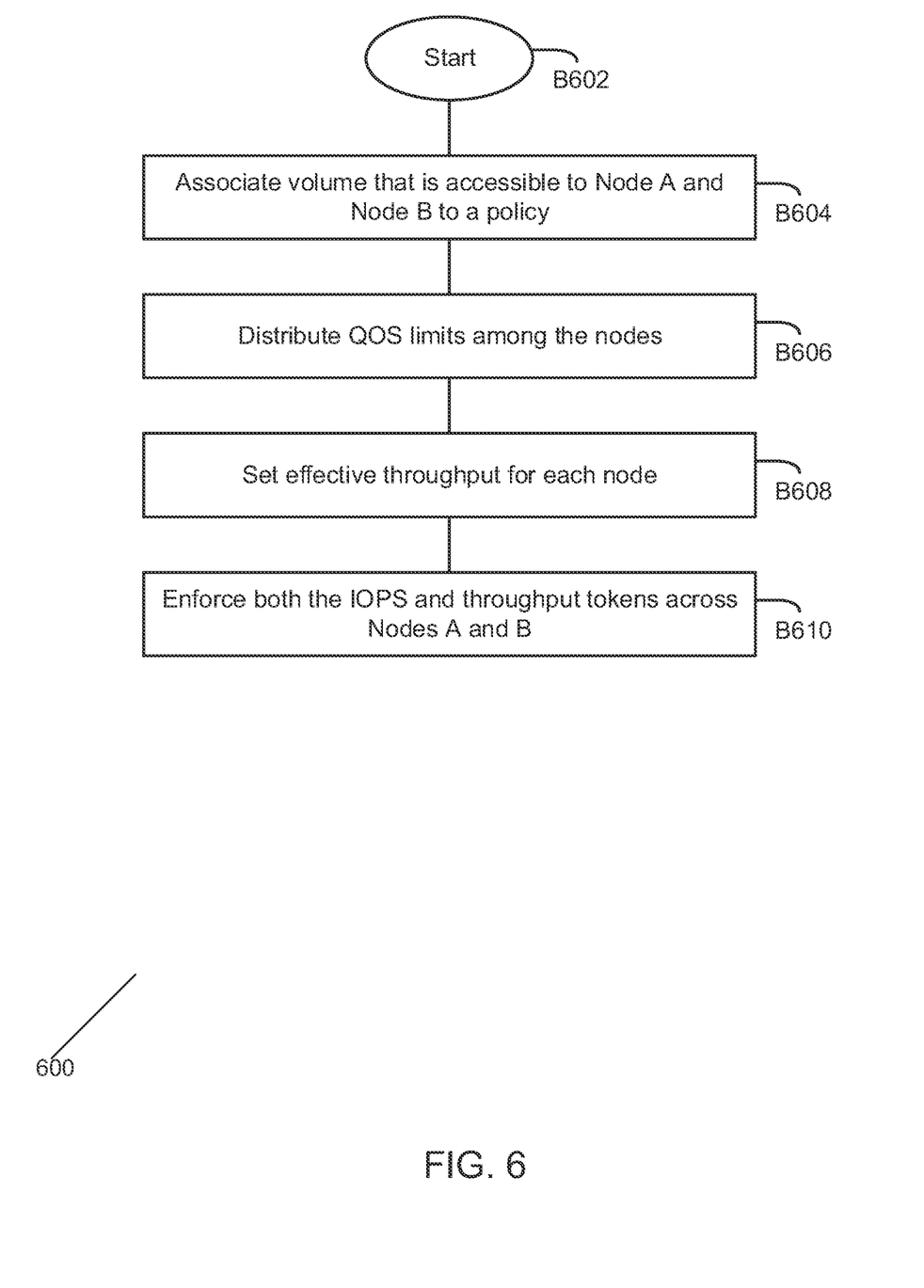

FIG. 6 shows a process 600 for managing IOPS and throughput across different nodes. The process begins in block B602 when the storage system 202 is initialized and operational. In block B604, a volume (for example, V1) is associated with a policy (P1). The policy P1 defines a certain throughput and a certain number of IOPS for the volume, for example, 1024 IOPS and 1 MBps (megabytes per second).

Assume that the volume is accessible via at least two Nodes A and B. The QOS limits are assigned in block B606 between the two nodes. For example, IOPS limit of 1024 may be divided between Nodes A and B as (512, 512), (100, 924), (924, 100), (200, 824) or any other manner. The distribution may be based on traffic pattern of how the nodes are being used or any other factor.

In block B608, the throughput limit is assigned for each node. The throughput limit may be based on the following; (assigned IOPS/total IOPs)*throughput rate for the volume. For example, if Node A is assigned 100 IOPS of 1024, then the throughput rate for Node A is (100/1024)*1 MBps=102400 KBps (Kilo Bytes per second). For Node B, the throughput is (924/1024)*1 MBps=947176 KBps.

Thereafter, in block B610, to process a request, both the IOPS and throughput tokens are used by each Node, using the process of FIG. 5, described above in detail.

The foregoing processes and systems have advantages over conventional QOS models where either IOPS or throughput are used to throttle request processing. When only IOPS are used for managing QOS, then a client may send a request with a large throughput size to circumvent the QOS process. Similarly, if only throughput were used to manage QOS, then a client may send a large number of I/O requests with smaller data transfer size i.e. even though the through limit is met, the system is still burdened by a high number of I/O requests. The foregoing process and system solve this shortcoming by managing QOS using both throughput and IOPS tokens.

Figure 7:
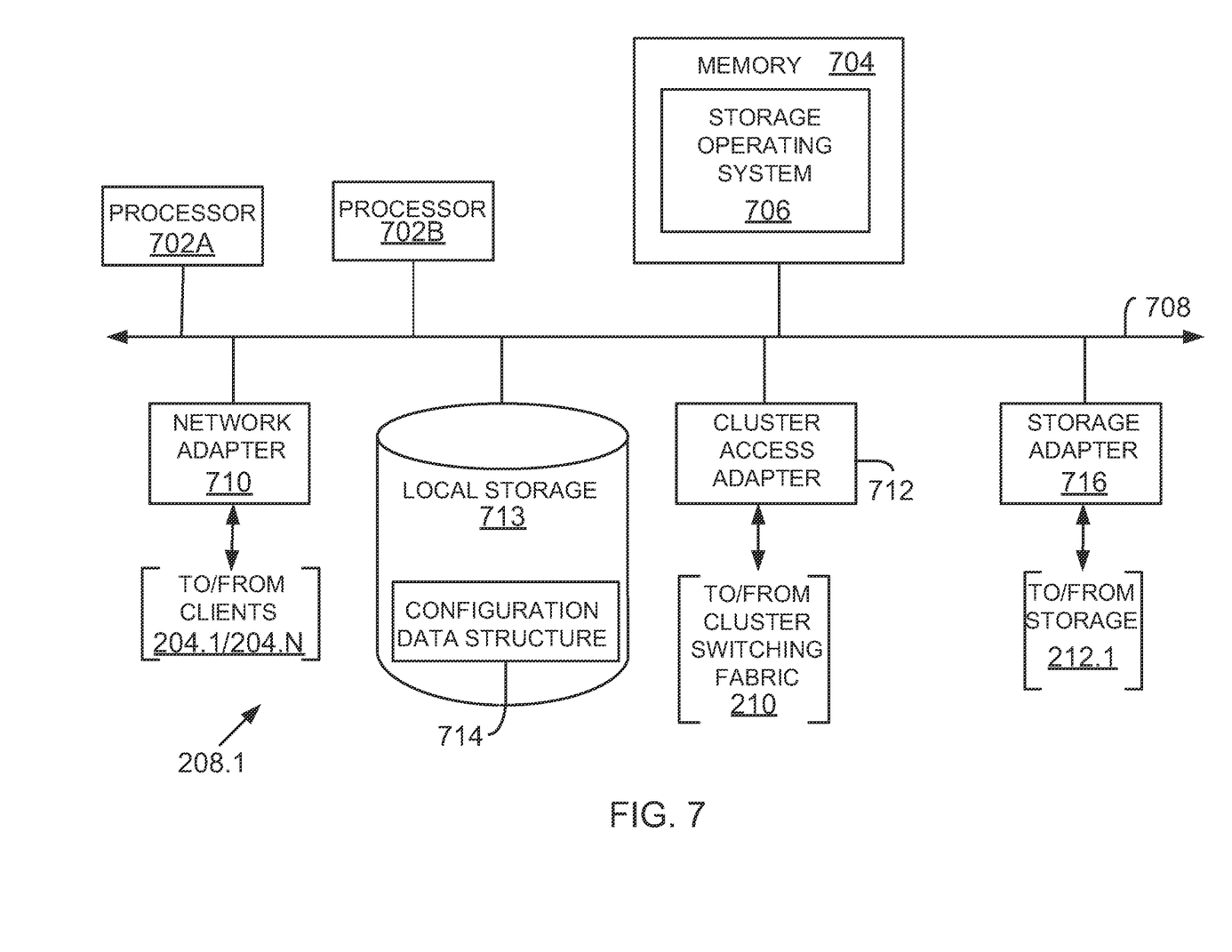
FIG. 7 shows an example of a storage system, used according to one aspect of the present disclosure.

Storage System Node: FIG. 7 is a block diagram of a node 208.1 that is illustratively embodied as a storage system comprising of a plurality of processors 702A and 702B, a memory 704, a network adapter 710, a cluster access adapter 712, a storage adapter 716 and local storage 713 interconnected by a system bus 708.

Processors 702A-702B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

The local storage 713 comprises one or more storage devices utilized by the node to locally store configuration information for example, in a configuration data structure 714. The configuration information may include information regarding storage volumes and the QOS associated with each storage volume.

The cluster access adapter 712 comprises a plurality of ports adapted to couple node 208.1 to other nodes of cluster 202. In the illustrative aspect, Ethernet may be used as the clustering protocol and interconnect media, although it will be apparent to those skilled in the art that other types of protocols and interconnects may be utilized within the cluster architecture described herein. In alternate aspects where the network modules and storage modules are implemented on separate storage systems or computers, the cluster access adapter 712 is utilized by the network/storage module for communicating with other network/storage-modules in the cluster 202.

Each node 208.1 is illustratively embodied as a dual processor storage system executing a storage operating system 706 (similar to 107, FIG. 1) that preferably implements a high-level module, such as a file system, to logically organize the information as a hierarchical structure of named directories and files at storage 212.1. However, it will be apparent to those of ordinary skill in the art that the node 208.1 may alternatively comprise a single or more than two processor systems. Illustratively, one processor 702A executes the functions of the network module on the node, while the other processor 702B executes the functions of the storage module.

The memory 704 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the disclosure described herein.

The storage operating system 706 portions of which is typically resident in memory and executed by the processing elements, functionally organizes the node 208.1 by, inter alia, invoking storage operation in support of the storage service implemented by the node.

The network adapter 710 comprises a plurality of ports adapted to couple the node 208.1 to one or more clients 204.1/204.N over point-to-point links, wide area networks, virtual private networks implemented over a public network (Internet) or a shared local area network. The network adapter 710 thus may comprise the mechanical, electrical and signaling circuitry needed to connect the node to the network. Each client 204.1/204.N may communicate with the node over network 206 (FIG. 2) by exchanging discrete frames or packets of data according to pre-defined protocols, such as TCP/IP.

The storage adapter 716 cooperates with the storage operating system 706 executing on the node 208.1 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored at storage device 212.1. The storage adapter 716 comprises a plurality of ports having input/output (I/O) interface circuitry that couples to the storage devices over an I/O interconnect arrangement, such as a conventional high-performance, Fibre Channel link topology.

Figure 8:
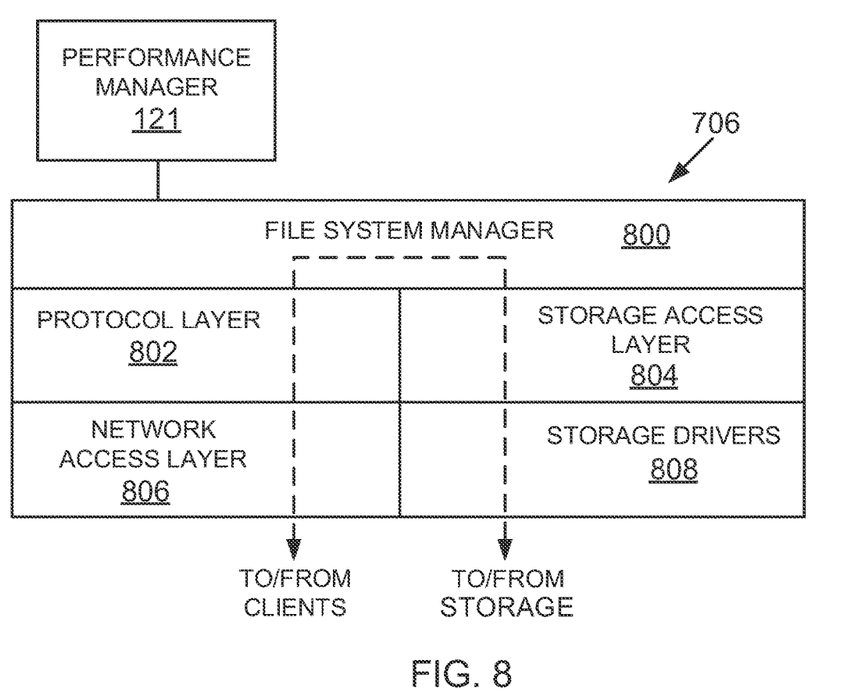
FIG. 8 shows an example of a storage operating system, used according to one aspect of the present disclosure.

Operating System: FIG. 8 illustrates a generic example of storage operating system 706 (or 107, FIG. 1) executed by node 208.1, according to one aspect of the present disclosure. The storage operating system 706 interfaces with the QOS module 109 such that QOS policies are implemented at the storage volume level.

In one example, storage operating system 706 may include several modules, or "layers" executed by one or both of network module 214 and storage module 216. These layers include a file system manager 800 that keeps track of a directory structure (hierarchy) of the data stored in storage devices and manages read/write operation, i.e. executes read/write operation on storage in response to client 204.1/204.N requests.

Storage operating system 706 may also include a protocol layer 802 and an associated network access layer 806, to allow node 208.1 to communicate over a network with other systems, such as clients 204.1/204.N. Protocol layer 802 may implement one or more of various higher-level network protocols, such as NFS, CIFS, Hypertext Transfer Protocol (HTTP), TCP/IP and others.

Network access layer 806 may include one or more drivers, which implement one or more lower-level protocols to communicate over the network, such as Ethernet. Interactions between clients' and mass storage devices 212.1-212.3 (or 114) are illustrated schematically as a path, which illustrates the flow of data through storage operating system 706.

The storage operating system 706 may also include a storage access layer 804 and an associated storage driver layer 808 to allow storage module 216 to communicate with a storage device. The storage access layer 804 may implement a higher-level storage protocol, such as RAID (redundant array of inexpensive disks), while the storage driver layer 808 may implement a lower-level storage device access protocol, such as Fibre Channel or SCSI. The storage driver layer 808 may maintain various data structures (not shown) for storing information regarding storage volume, aggregate and various storage devices.

As used herein, the term "storage operating system" generally refers to the computer-executable code operable on a computer to perform a storage function that manages data access and may, in the case of a node 208.1, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a storage device directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present disclosure may be utilized with any suitable file system, including a write in place file system.

Figure 9:
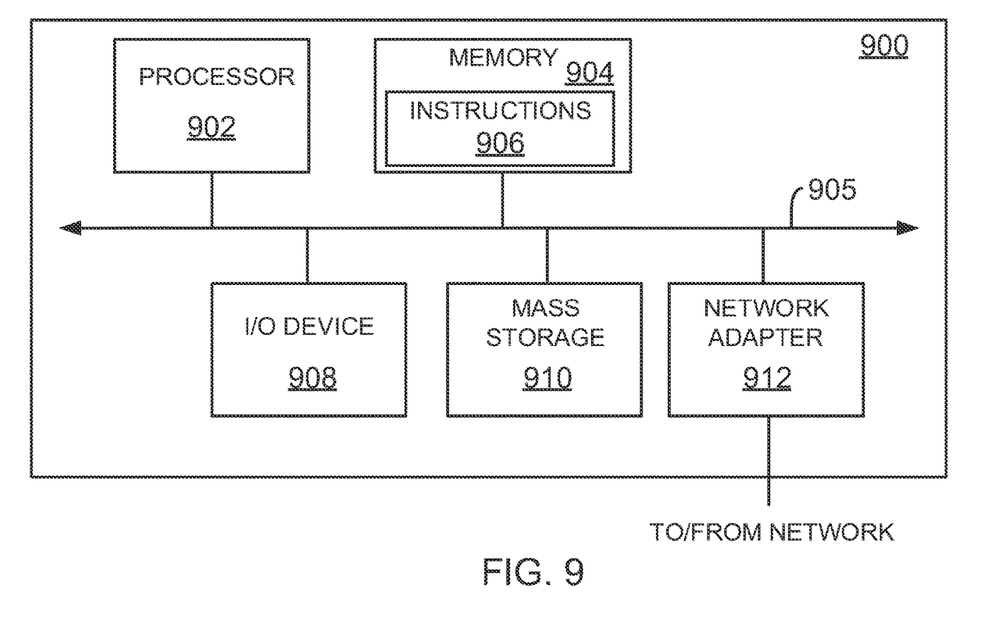
FIG. 9 shows an example of a processing system, used according to one aspect of the present disclosure.

Processing System: FIG. 9 is a high-level block diagram showing an example of the architecture of a processing system 900 that may be used according to one aspect. The processing system 900 can represent the host system 102, the management console 118, the performance manager 121, clients 116, 204, or the storage system 108. Note that certain standard and well-known components which are not germane to the present aspects are not shown in FIG. 9.

The processing system 900 includes one or more processor(s) 902 and memory 904, coupled to a bus system 905. The bus system 905 shown in FIG. 9 is an abstraction that represents any one or more separate physical buses and/or point-to-point connections, connected by appropriate bridges, adapters and/or controllers. The bus system 905, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 902 are the central processing units (CPUs) of the processing system 900 and, thus, control its overall operation. In certain aspects, the processors 902 accomplish this by executing software stored in memory 904. A processor 902 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 904 represents any form of random access memory (RAM), read-only memory (ROM), flash memory, or the like, or a combination of such devices. Memory 904 includes the main memory of the processing system 900. Instructions 906 implement the process steps of FIGS. 5 and 6 described above may reside in and executed by processors 902 from memory 904.

Also connected to the processors 902 through the bus system 905 are one or more internal mass storage devices 910, and a network adapter 912. Internal mass storage devices 910 may be, or may include any conventional medium for storing large volumes of data in a non-volatile manner, such as one or more magnetic or optical based disks. The network adapter 912 provides the processing system 900 with the ability to communicate with remote devices (e.g., storage servers) over a network and may be, for example, an Ethernet adapter, a Fibre Channel adapter, or the like.

The processing system 900 also includes one or more input/output (I/O) devices 908 coupled to the bus system 905. The I/O devices 908 may include, for example, a display device, a keyboard, a mouse, etc.

Cloud Computing: The system and techniques described above are applicable and especially useful in the cloud computing environment where storage is presented and shared across different platforms. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to a network, for example, the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer, is a cloud platform and cloud infrastructure, followed by a "server" layer that includes hardware and computer software designed for cloud specific services. The storage systems/performance manager described above can be a part of the server layer for providing storage services. Details regarding these layers are not germane to the inventive aspects.

Thus, methods and apparatus for managing QOS in a storage environment have been described. Note that references throughout this specification to "one aspect" or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method comprising:
    associating a first quality of service policy with a first storage volume;
    associating a second quality of service policy with a second storage volume;
    constructing a quality of service policy group to comprise the first quality of service policy and the second quality of service policy;
    evaluating, by a quality of service request classifier, an I/O request to identify attributes of the I/O request corresponding to at least one of a source, a path, a destination, or I/O properties;
    in response to the attributes matching a quality of service policy within the quality of service policy group, assigning the I/O request to a workload associated with the quality of service policy for processing the I/O request using a stream of the workload; and
    in response to the attributes not matching any quality of service policy within the quality of service policy group, assigning the I/O request to a default workload for processing the I/O request using a stream of the default workload.

2. The method of claim 1, comprising:
    utilizing the quality of service policy group to manage the first storage volume and the second storage volume as a single unit.

3. The method of claim 1, comprising:
    creating a new workload comprising a set of streams targeting the first storage volume.

4. The method of claim 3, wherein a stream comprises a plurality of requests directed to the first storage volume.

5. The method of claim 3, comprising:
    grouping a first stream and a second stream into the set of streams comprised within the new workload based upon information associated with a first client associated with the first stream and a second client associated with the second stream.

6. The method of claim 3, comprising:
grouping a first stream of a first client and a second stream of a second client into the set of streams comprised within the new workload based upon the first stream and the second stream corresponding to a source restriction.

7. The method of claim 1, comprising:
utilizing an object hierarchy to track information related to resources within a clustered storage system hosting the first storage volume and the second storage volume.

8. A non-transitory machine readable medium comprising instructions to:
associate a first quality of service policy with a first storage volume;
associate a second quality of service policy with a second storage volume;
construct a quality of service policy group to comprise the first quality of service policy and the second quality of service policy;
evaluate, by a quality of service request classifier, an I/O request to identify attributes of the I/O request corresponding to at least one of a source, a path, a destination, or I/O properties;
in response to the attributes matching a quality of service policy within the quality of service policy group, assign the I/O request to a workload associated with the quality of service policy for processing the I/O request using a stream of the workload; and
in response to the attributes not matching any quality of service policy within the quality of service policy group, assign the I/O request to a default workload for processing the I/O request using a stream of the default workload.

9. The non-transitory machine readable medium of claim 8, wherein the instructions include:
utilizing an object hierarchy to track information related to resources within a clustered storage system hosting the first storage volume and the second storage volume.

10. The non-transitory machine readable medium of claim 9, wherein the instructions include:
utilizing a cache object within the object hierarchy to track utilization and latency of a cache.

11. The non-transitory machine readable medium of claim 9, wherein the instructions include:
utilizing an aggregate object within the object hierarchy to track utilization and latency of an aggregate.

12. The non-transitory machine readable medium of claim 9, wherein the instructions include:
utilizing a CPU object within the object hierarchy to track utilization and latency of a CPU.

13. The non-transitory machine readable medium of claim 9, wherein the instructions include:
utilizing a quality of service object within the object hierarchy to track the first quality of service policy.

14. The non-transitory machine readable medium of claim 9, wherein the instructions include:
utilizing a port object within the object hierarchy to track utilization and latency of a port.

15. The non-transitory machine readable medium of claim 9, wherein the instructions include:
utilizing a storage virtual machine object within the object hierarchy to track utilization and latency of a storage virtual machine.

16. A computing device comprising:
a memory comprising machine executable code; and
a processor coupled to the memory, the processor configured to execute the machine executable code to cause the processor to:
associate a first quality of service policy with a first storage volume;
associate a second quality of service policy with a second storage volume; and
construct a quality of service policy group to comprise the first quality of service policy and the second quality of service policy;
evaluate, by a quality of service request classifier, an I/O request to identify attributes of the I/O request corresponding to at least one of a source, a path, a destination, or I/O properties;
in response to the attributes matching a quality of service policy within the quality of service policy group, assign the I/O request to a workload associated with the quality of service policy for processing the I/O request using a stream of the workload; and
in response to the attributes not matching any quality of service policy within the quality of service policy group, assign the I/O request to a default workload for processing the I/O request using a stream of the default workload.

17. The computing device of claim 16, wherein the machine executable code causes the processor to:
utilize the quality of service policy group to manage the first storage volume and the second storage volume as a single unit.

18. The computing device of claim 16, wherein the machine executable code causes the processor to:
create a new workload comprising a set of streams targeting the first storage volume.

19. The computing device of claim 18, wherein a stream comprises a plurality of requests directed to the first storage volume.

20. The computing device of claim 18, wherein the machine executable code causes the processor to:
group a first stream and a second stream into the set of streams comprised within the new workload based upon information associated with a first client associated with the first stream and a second client associated with the second stream.

* * * * *